United States Patent [19]

Grippin

[11] Patent Number: 5,220,631
[45] Date of Patent: Jun. 15, 1993

[54] FIBER OPTIC CAMOUFLAGE

[76] Inventor: Raymond R. Grippin, 7311 Durenda Ct., Anchorage, Ak. 99507

[21] Appl. No.: 812,097

[22] Filed: Dec. 23, 1991

[51] Int. Cl.$^5$ .............................................. G02B 6/06
[52] U.S. Cl. ..................................... 385/115; 385/119
[58] Field of Search ................................. 385/115-121

[56] References Cited

U.S. PATENT DOCUMENTS

| | | | |
|---|---|---|---|
| 2,992,587 | 7/1961 | Hicks, Jr. et al. | 385/116 |
| 3,985,424 | 10/1976 | Steinacher | 385/119 |
| 4,167,303 | 9/1979 | Bowen et al. | 385/89 |
| 4,189,207 | 2/1980 | Fisher et al. | 385/116 |
| 4,397,524 | 8/1983 | Yoshimura et al. | 385/116 |
| 4,969,707 | 11/1990 | Hopkins | 385/116 |

FOREIGN PATENT DOCUMENTS

| | | | |
|---|---|---|---|
| 63-237003 | 10/1988 | Japan | 385/116 |
| 3-204602 | 9/1991 | Japan | 385/115 |
| 3-241304 | 10/1991 | Japan | 385/116 |
| 9107295 | 5/1991 | PCT Int'l Appl. | 385/119 |

Primary Examiner—John D. Lee
Assistant Examiner—John Ngo
Attorney, Agent, or Firm—Richard C. Litman

[57] ABSTRACT

A camouflage device uses fiber optic cables to conceal an object by routing light around the object using the fiber optic cables. Lenses are used to focus light into and transmit light coming from each end of the fiber optic cables. Each lens is connected to one end of a conical section with the other end connected to one end of a fiber optic cable, while at the other end of the fiber optic cable is another attached conical section and lens. Each lens configuration having a pair of lens and conical sections connected by a fiber optic cable is positioned around the object to be concealed in such a way that any light entering a lens is transmitted around the object to be concealed by the fiber optic cable attached to the lens and then out the other lens of the lens configuration.

11 Claims, 2 Drawing Sheets

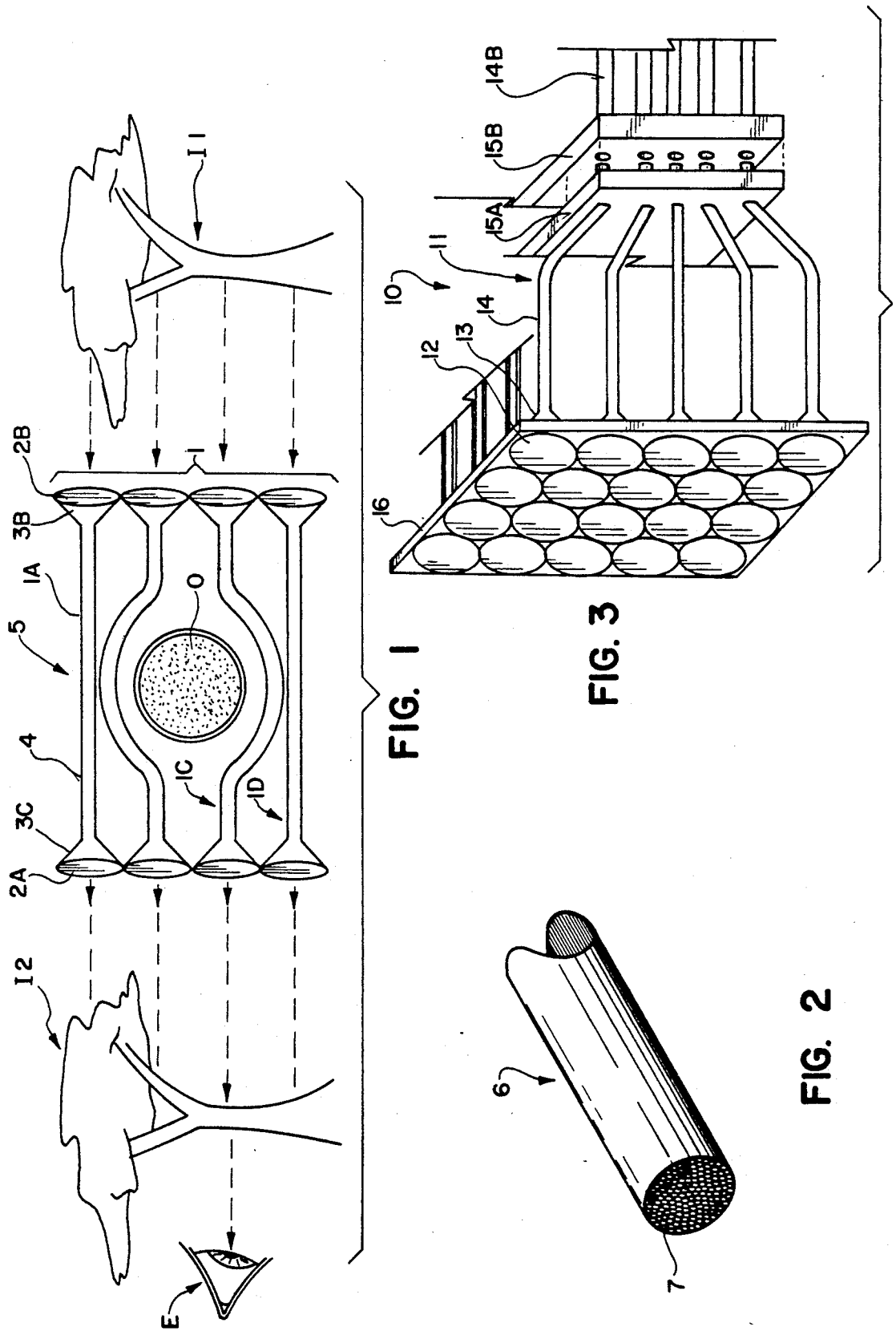

FIBER OPTIC CAMOUFLAGE

BACKGROUND OF THE INVENTION

1. Field of the Invention

This invention employs a camouflage technique developed in early World War II where a distant object may be hidden by matching the light intensity on the front side of an object with the light intensity in the background of the object. By matching the light intensities of the object and its background, the shadows and outlines of that object which make it visible to the human eye are reduced. For example, the British would put a row of lights with adjustable light intensities on the wings of their aircraft to match the background light intensity of the sky. This would aid in concealing their aircraft when viewed from a long distance.

In the present invention, not only is the background light intensity matched along any direction in which the object may be viewed, but a real image of that background is projected between the viewer and the object to be concealed. This is accomplished by the use fiber optic cables used to bend any light coming at the object around it without altering the direction of the light.

2. Description of the Prior Art

Fiber optic cables are used to transmit data from one location to another. A fiber optic cable (F.O.C.) consists of a bundle of individual fiber strand elements which are translucent thereby allowing light to travel from one end of the strand to the other. At each end of the F.O.C. are the ends of the many individual elements. For image data, each one of these ends make up one pixel of the image data.

U.S. Pat. No. 2,992,587 issued Jul. 18, 1961 to John W. Hicks, Jr. et al. discloses a F.O.C. and method of making the same, wherein the internal reflection of the light is high in each element. Furthermore, means are provided at each end of the cable for preventing stray light from entering the cable.

U.S. Pat. No. 3,985,424 issued Oct. 12, 1976 to Ken Steinacher and U.S. Pat. No. 4,969,707 issued Nov. 13, 1990 to Ralph C. Hopkins disclose the use of F.O.C.s used to provide image data from the rear of a vehicle to the operator of the vehicle instead of the conventional rear view mirror.

U.S. Pat. No. 4,167,303 issued Sep. 11, 1979 to Terry P. Bowen, et al. discloses a fiber optic connector for connecting a plurality of fiber optic cables to another plurality of like fiber optic cables while maintaining accurate alignment when connected.

U.S. Pat. No. 4,189,207 issued Feb. 19, 1980 to Charles B. Fisher et al. discloses a F.O.C. having a portion of the cable where the reflectivity of each element is reduced.

U.S. Pat. No. 4,397,524 issued Aug. 9, 1983 to Kozo Yoshimura et al. discloses an image transmitting F.O.C. and method of making the same, in which the relative position of the elements of the F.O.C. are maintained throughout the cable so that each pixel of image data entering on end of the cable is in the same relative position with every other pixel of image data once it reaches the other end of the cable.

None of the prior art show the use of F.O.C.s to conceal an object as used in the present invention.

SUMMARY OF THE INVENTION

Accordingly, it is one object of the present invention to bend the light approaching an object around the object without changing the direction of the light.

It is another object of the present invention to accomplish the bending of the light using a plurality of lenses and F.O.C. configurations.

It is still another object of the present invention to provide a variety of lens and F.O.C. configurations depending of the size and shape of the object to be concealed.

These and other objects of the present invention will become clear with further review of the following disclosure.

This invention uses parallel image transmitting optical fiber bundles with identically focused lenses at both ends of each fiber bundle. Each fiber element is maintained in proper relative position with every other element throughout the length of the fiber bundle so that every portion of the image as focused on the end of each fiber element, herein referred to as a pixel, is in the same relative position with every other pixel at the other end of the fiber bundles.

Furthermore, this invention uses a plurality of configurations of focused lenses, wherein the lens on one side of a configuration makes up one pixel of an image plane along with all the other lenses of the other configurations, herein referred to as a lens group. These other lenses of the lens group form the other pixels of the image plane, herein referred to as a pixel plane. Each lens on both sides of a fiber bundle is rigidly fixed to either other lenses or some other structure on which the other lenses are also attached. In this way, each lens of a lens group is maintained in a fixed relationship with every other lens in that group so that every pixel of the image plane can be maintained in the same relationship in the pixel plane of the other lens group containing the lenses of the opposite end of each fiber bundle. The fiber bundles themselves do not have to be maintained in a particular relationship but may be placed around the object in any fashion since the lenses themselves are held in a fixed relationship to one another.

By using this pixel plane concept in three dimensions, a large object, such as an airplane sitting on an airfield or a tank sitting in open desert, could be rendered virtually invisible from any direction and from a distance much closer than currently possible with conventional camouflage techniques.

Another application of the present invention would be to fix the lenses to clothing of a suit to be worn by a person. In this arrangement, the lenses could be attached to the material of the suit with the fiber bundles sown into the suit. Each fiber bundle of a particular lens would travel along the inside of the suit to the opposite end of the suit where it would transmit the pixel image from the particular lens to another lens in opposite relationship with the particular lens.

A further understanding of the various embodiments and their applications can be achieved by further inspection of the specification to follow along with the drawings.

BRIEF DESCRIPTION OF THE DRAWINGS

FIG. 1 shows a cross-sectional side view of a first embodiment of the present invention in the environment in which it is to be used.

FIG. 2 shows a conventional fiber optic cable to be used by the present invention as is known in the prior art.

FIG. 3 shows a perspective side view of a second embodiment of the present invention.

DETAILED DESCRIPTION OF THE INVENTION

Figure 5:
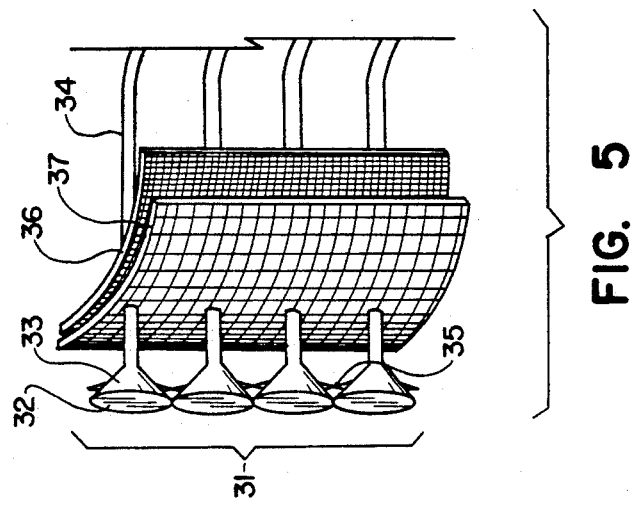
FIG. 5 shows an exploded cross-sectional view of a fourth embodiment of the present invention.

FIG. 1 shows a column 1 of lens configurations 1A-1D of a camouflage device 5 of the first embodiment. While only one column is shown in FIG. 1, it is to be understood that a plurality of columns located side by side is used in device 5. Further, while only four lens configurations 1A-1D are shown, any number of configurations could be included in a column.

As shown in FIG. 1, a lens configuration 1A comprises a lens 2A fixed to a one side of a conical section 3C. At the other end of the conical section 3C, one end of an O.F.C. 4 is attached which carries light from and to the lens 2A. The lens 2A is held by the one side of the conical section 3C at a distance from the other end equivalent to the focal length of the lens 2A. In this way, the light entering the lens 2A is focused onto the F.O.C. 4 located at the other end of the conical section 3C. Each lens configuration of device 5 is constructed in the same way as configuration 1A and each lens of the lens groups on both sides of the device 5 is rigidly held to every other lens of the lens group on which that lens belongs by an conventional method. Further, both lenses of a lens configuration are identically focused lenses.

Each lens configuration also receives and transmits light from both ends of the configuration. For example, the first embodiment as illustrated in FIG. 1 shows an environment in which a human eye E is observing a tree. The object O to be concealed is located between the human eye E and the tree, but is not observed by the eye E since the image of the tree I1 impinging on the lens group of which lens 2B is a member is transmitted to the other lens group as an image I2 which is observed by the human eye E. In FIG. 1, the image I1 impinging on the lens group is received by each lens of the lens group making up one pixel of image information to be received by the other lens group. For example, the light entering the lens 2B makes up one pixel of image data. This pixel of image data is inverted up side down when focused on the end of F.O.C. 1A connected to the end of conical section 3C. Once the inverted pixel of image data is transmitted out the other end of the F.O.C. 4 and to lens 2A, the image of pixel data is inverted again to be right side up. This holds true for every other lens configuration of device 5. In this way, every pixel of image data of the image I1 is transmitted by the lens group on one end of the device 5 to form the image I2 by the other lens group closest to the human eye E so that the object located between the two lens groups is unobserved by the human eye E. One analogy is to think of each lens group as a windowpane of a window in which light between each windowpane is bent around an object to be concealed. The bending of the light in this instance is accomplished by the fiber optic cables of the device 5. In this way, a person looking through the window at either end would only see what is on the other side of the window and not what is between the windowpanes.

Each F.O.C. of the device 5 is preferably a conventional image transmitting F.O.C. The conventional telecommunications F.O.C.s do not maintain each fiber optic element in the cable in the same relative position throughout the cable as stringently as do image transmitting F.O.C.s. In FIG. 2, a conventional F.O.C. is illustrated. The cable 6 is made up of individual optical fiber elements 7 in which light impinging on each end of an element 7 is transmitted down the element and out the other end. This is illustrated in the prior art as shown in U.S. Pat. No. 4,189,207 issued to Kozo Yoshimura et al. made of record.

FIG. 3 illustrates a second embodiment similar to the first embodiment as illustrated in FIG. 1, except that the conical sections of the same lens configuration in the second embodiment have separate F.O.C.s which are connected together. In the second embodiment the lens of the same lens configuration are rigidly held together by a plate. As illustrated in FIG. 3, the camouflage device 10 has a lens group rigidly connected to a plate 16 by attaching the conical sections or the lenses themselves to the plate in any known manner. For example, lens 12 connected to one end of conical section 13 could be located either directly along, slightly below, or slightly above the outer surface of plate 15 in which all the other lenses of that lens group are also rigidly attached by preferably gluing the conical sections to which each lens of that lens group is connected to the plate 16 which has precut holes for each conical section to fit into.

As mentioned above, each lens configuration has a separate F.O.C. connected to the ends of the conical sections in which light from the respective lenses of the lens configuration is transmitted to and received from. For example, in FIG. 3 a lens configuration 11 is shown in part having a lens 12 connected to a conical section 13, which in turn is connected to a F.O.C. 14A, which is connected to one portion of a connector 15A. If the connector 15A is connected to another connector 15B, then F.O.C. 14A is connected to F.O.C. 14B of the lens configuration 11, which in turn is connected to another conical section and lens attached to a plate like plate 16 (not illustrated). Also not illustrated are all the other lens configurations of device 10 connected to lens plate 16. Each lens configuration of device 10 is identical to lens configuration 11. As shown in FIG. 3, all the lenses in the same column as lens 12 are connected to connector 15A which in turn connects each half of the respective lens configurations in the same column as lens 12 with the other half of the respective lens configurations not illustrated. The lens configurations of the other columns are also connected to connector 15A which are in turn connected to the other half of their respective lens configurations by a connector 15B. Connector 15A and 15B are any conventional optical connectors known in the art such as illustrated in U.S. Pat. No. 4,167,303 issued to Bowen et al. and made of record.

Figure 4:
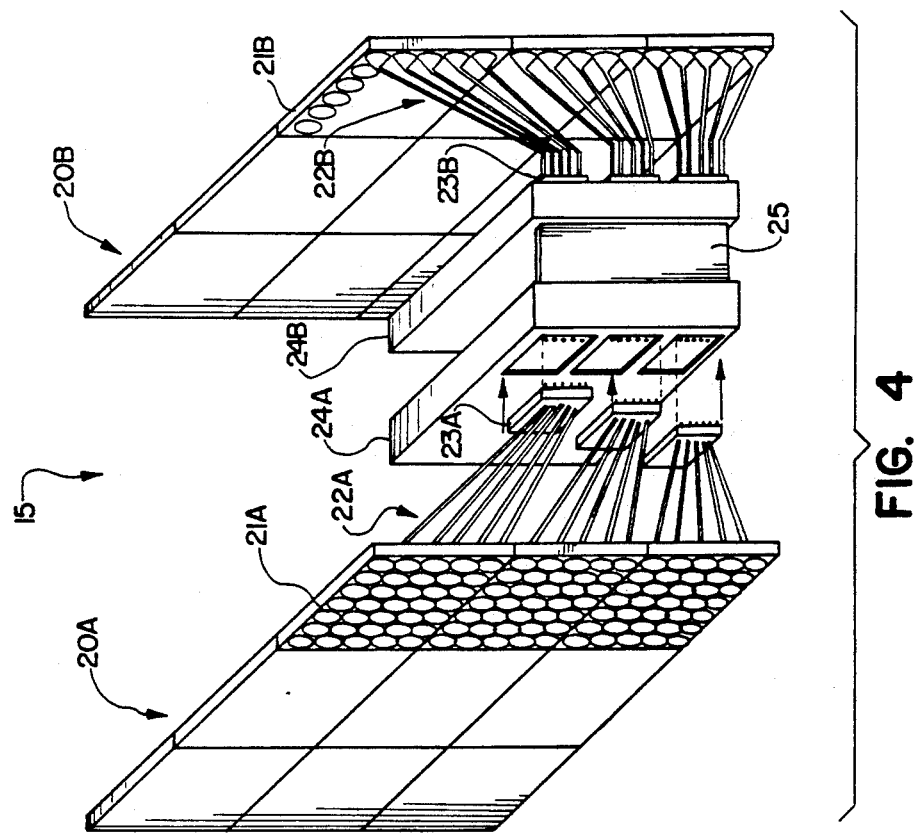
FIG. 4 shows a perspective side view of a third embodiment of the present invention.

FIG. 4 illustrates a third embodiment similar to the second embodiment of FIG. 3, except that a plurality of lens plates like lens plate 16, containing individual lens groups as discussed in the second embodiment, are attached together to form a larger pixel plane. In the third embodiment, the image plane would impinge on the pixel plane containing all of the pixels of the individual lens groups of the lens plates attached together. Further, each connector of each lens plate is attached to a larger connector so that the plurality of lens plates connected together, herein referred to as a lens group plate, are easily connected to another lens group plate.

More specifically, as shown in FIG. 4, a plurality of lens plates, such as lens plate 21A, are connected together to form a lens group plate 20A. Each lens plate, such as lens plate 21A, of the lens group plate 20A has the F.O.C.s 22A of each half of the lens configuration of lens plate 21A connected to a connector 23A as discussed in the second embodiment of FIG. 3. However, each connector 23A is attached to a larger connector 24A instead on another like connector as described in the embodiment of FIG. 3. In this way, the connection of each pixel of the lens group plate 20A is connected to a larger connector 24A which in turn is connected to another like connector 24B by way of an optical fiber bus 25. The optical fiber bus 25 simply contains the individual F.O.C.s which are connected to the lenses of lens group plate 20A. The optical fiber bus 25 can by any length necessary. In this way, by connecting connector 24B to the individual connectors of the lens plates, each lens plate has every lens of the lens plate group 20B connected to the appropriate lens of lens group plate 20A. For example, connector 23B as illustrated is connected to the connector 24B, thereby connecting each and every lens of lens plate 21B via F.O.C.s 22B to the other half of the lens configuration of the lens group of lens plate 21A. By connecting the individual connectors of each lens plate to a larger connector using an optical bus 25, the lens group plate containing a plurality of lens plates can be separated by a greater distance. However, the F.O.C.s of the individual lens plates such as F.O.C.s 22A and 23B could be made to any length and directly connected to each other as shown in FIG. 3.

A fourth embodiment of the present invention is illustrated in FIG. 5. In FIG. 5, half of one side of a lens configuration is connected to one side a piece of clothing as shown, while the other half of each lens configuration is attached to the opposite side of the clothing (not shown). In this way, a personal suit using the fiber optic camouflage arrangement equivalent to the first embodiment is achieved. More specifically, as shown in FIG. 5 a column of lens configurations identical to those of the first embodiment of FIG. 1 is shown. However, in FIG. 5 only half of the configuration is shown to illustrate how the lenses are attached to the clothing. The column 31 has a lens configuration containing a F.O.C. 34 connected to a conical section 33 on which a lens 32 is attached as described in the first embodiment. The F.O.C. 34 runs through a cotton inner liner 36 and also through a black semi-elastic fabric 37 which is sown to the cotton liner 36. The conical section 33 is preferably made of molded plastic with dog ears 35 connected thereto for attachment to the semi-elastic fabric 37. Each lens configuration of FIG. 5 is identical. The F.O.C.s of each lens configuration is sown into the suit. In this way, a personal suit and the person wearing the suit are camouflaged.

It is to be understood that may modifications to the disclosed embodiments may be made within the scope of the present invention. For example, while the lens plate of the second embodiment as illustrated in FIG. 3 is shown to be planar, any shape of the lens plate is possible, for example triangular, or semi-spherical. Also, while the lens group plate of the third embodiment as illustrated in FIG. 4 is shown to be planar, the individual lens plates could be arranged at any angle with each other. Also, while only one lens plate configuration is shown consisting of lens plate 20A connected to lens plate 20B, it is to be understood that a plurality of lens plate groups is intended to completely enclose the object so as to conceal the object along any direction it may be viewed. Further, while image transmitting F.O.C. are disclosed as the preferred light bending elements of the present invention, other fiber optic elements could be used such as telecommunications F.O.C. if image quality is not real critical or fiber optic bundles where individual fiber optic elements bundled together as discrete parts are used instead of a fiber optic cable having fiber optic elements as an integral part of the fiber optic cable.

It is to be further understood that the invention is not limited to the specific embodiments as illustrated above, but is intended to encompass all the embodiment within the scope of the following claims.

I claim:

1. A fiber optic camouflage device, comprising:
   a first lens group comprising a plurality of first lenses, each being a first part of a lens configuration pair;
   a second lens group comprising a plurality of second lenses, each being a second part of a said lens configuration pair;
   a plurality of first fiber optic bundles, having a first end and a second end;
   a plurality of first lens holders, each having a first end rigidly and securely fastened to one of said plurality of first lenses and a second end rigidly and securely fastened to the first end of one of said plurality of first fiber optic bundles, thereby positioning said one of said plurality of first lenses at the proper focal distance from the first end of said one of said plurality of first fiber optic bundles; and
   means for connecting said first lens group and said second lens group so that all light entering into or exiting from any one of said plurality of first lenses belonging to said first part of a particular lens configuration pair is transmitted to or received from, respectively, the one of said plurality of second lenses belonging to the second part of said particular lens configuration pair, wherein the direction of the light entering into said one of said plurality of first lenses is unchanged upon exiting said one of said plurality of second lenses and the direction of the light exiting said one of said plurality of first lenses is unchanged from the light which entered said one of said plurality of second lenses, so that an object located between said first and second lens group is camouflaged when viewed along any direction of light entering or exiting any of the said lenses of the first and second lens groups.

2. A fiber optic camouflage device as claimed in claim 1, wherein said second lens group further comprises:
   a plurality of second lens holders each comprising a first and second end,
   wherein said plurality of second lenses are rigidly and securely fastened to said first ends of each of said plurality of second lens holders so as to be at a proper focal distance from said second ends of each of said plurality of second lens holder.

3. A fiber optic camouflage device as claimed in claim 2, wherein said means for connecting further comprise means for securing the second end of each of said plurality of first fiber optic bundles of said first lens group with the corresponding second end of each of said plurality of second lens holders of said second lens group so as to connect the first and second parts of each lens configuration pair.

4. A fiber optic camouflage device as claimed in claim 3, further comprising:

a suit having an outer material layer; and means for attaching the lens holders of each lens of both the first and second lens groups to said outer material layer.

5. A fiber optic camouflage device as claimed in claim 4, wherein the first lens group is attached to a predetermined half of the outer material layer and the second lens group is attached to a predetermined other half of the material layer, such that there are lenses along every direction in which the suit may be viewed so as to completely conceal the suit and a user wearing the suit.

6. A fiber optic camouflage device as claimed in claim 5, wherein each of said fiber optic bundles comprise image transmitting fiber optic cables.

7. A fiber optic camouflage device as claimed in claim 6, wherein each of said plurality of first lenses belonging to said first part of each lens configuration pair and the corresponding second lens belonging to said second part of each lens configuration pair are identically focused lenses.

8. A fiber optic camouflage device as claimed in claim 2, wherein said means for connecting further comprise:

a plurality of first connectors attached to the second end of each of said plurality of first fiber optic bundles of said first lens group;

a plurality of second fiber optic bundles each having a first and second end, wherein the first end of each of said plurality of second fiber optic bundles is attached to said second end of each of said plurality of second lens holders; and a plurality of second connectors attached to the second end of each of said plurality of second fiber optic bundles.

9. A fiber optic camouflage device as claimed in claim 8, wherein said plurality of first fiber optic bundles and said plurality of second fiber optic bundles comprise image transmitting fiber optic cables.

10. A fiber optic camouflage device as claimed in claim 9, wherein each of said plurality of first lenses belonging to said first part of each lens configuration pair and the corresponding second lens belonging to said second part of each lens configuration pair are identically focused lenses.

11. A fiber optic camouflage device as claimed in claim 8, wherein said means for connecting further comprise:

a third connector comprising means for receiving said plurality of first connectors;

a fourth connector comprising means for receiving said plurality of second connectors; and a plurality of third optic bundles for connecting said third and fourth connectors.

* * * * *